US012560013B2

(12) United States Patent
Balbo di Vinadio

(10) Patent No.: US 12,560,013 B2
(45) Date of Patent: Feb. 24, 2026

(54) MOVEMENT SYSTEM FOR ONE LEAF OF A LIFT-SLIDING DOOR OR LIFT-SLIDING DOOR-WINDOW, AS WELL AS LIFT-SLIDING DOOR OR LIFT-SLIDING DOOR-WINDOW INCLUDING THE MOVEMENT SYSTEM

(71) Applicants: Titawin SA, Lugano (CH); Aimone Balbo di Vinadio, Ponte Tresa (CH)

(72) Inventor: Aimone Balbo di Vinadio, Ponte Tresa (CH)

( * ) Notice: Subject to any disclaimer, the term of this patent is extended or adjusted under 35 U.S.C. 154(b) by 0 days.

(21) Appl. No.: 18/847,622

(22) PCT Filed: Feb. 14, 2023

(86) PCT No.: PCT/IB2023/051330

§ 371 (c)(1), (2) Date: Sep. 16, 2024

(87) PCT Pub. No.: WO2023/156901

PCT Pub. Date: Aug. 24, 2023

(65) Prior Publication Data

US 2025/0215735 A1 Jul. 3, 2025

(30) Foreign Application Priority Data

Feb. 17, 2022 (IT) ........................ 102022000002912
Feb. 17, 2022 (IT) ........................ 102022000002915

(51) Int. Cl.
*E05D 15/56* (2006.01)

(52) U.S. Cl.
CPC ...... *E05D 15/565* (2013.01); *E05Y 2201/638* (2013.01); *E05Y 2201/68* (2013.01);
(Continued)

(58) Field of Classification Search
CPC .................................................... E05D 15/565
See application file for complete search history.

(56) References Cited

U.S. PATENT DOCUMENTS 4,731,950 A * 3/1988 Ullner .................. E05D 15/565 49/224
5,566,505 A * 10/1996 Kamezaki ........... E05D 15/1021 49/225

(Continued)

FOREIGN PATENT DOCUMENTS

DE 202018001610 U1 * 4/2018 ............ E05F 15/635
DE 202020104082 U1 * 8/2020 ............ E05F 15/652

(Continued)

*Primary Examiner* — Catherine A Kelly
(74) *Attorney, Agent, or Firm* — Themis Law

(57) ABSTRACT

A system for moving a leaf of a slidable lifting door or door-window between a locked lowered closed position, where the insulating element in the leaf is compressed against the floor and hinders sliding, and at least two unlocked raised closed and open positions, between which the leaf is free to slide, includes a guide rail, which can be anchored to a frame above the leaf; a sliding system slidably engaged in the guide rail; a movement system; and an actuator, which can be controlled by a user and engaged with the movement system so that the user can control the movement of the leaf between the locked lowered closed and unlocked raised closed positions exclusively when the leaf is in such positions. The movement and the sliding systems are operatively connected so that the sliding system slidably supports the leaf when in the unlocked raised closed position.

12 Claims, 18 Drawing Sheets

(52) U.S. Cl.
CPC ... *E05Y 2201/716* (2013.01); *E05Y 2201/722* (2013.01); *E05Y 2800/296* (2013.01)

(56) References Cited

U.S. PATENT DOCUMENTS

| | | | | |
|---|---|---|---|---|
| 8,281,519 | B2 * | 10/2012 | Lambertini | E05C 9/063 49/221 |
| 9,458,656 | B2 * | 10/2016 | Mickelson | E05D 15/565 |
| 10,597,921 | B2 * | 3/2020 | Alban | E05D 15/0669 |
| 10,934,761 | B2 * | 3/2021 | Cavarec | E05D 15/565 |
| 11,326,385 | B2 * | 5/2022 | Dreyer | E05F 1/04 |
| 12,006,748 | B2 * | 6/2024 | Reich | E05C 7/045 |
| 12,297,681 | B2 * | 5/2025 | Hooke | E06B 7/16 |

FOREIGN PATENT DOCUMENTS

| | | | | |
|---|---|---|---|---|
| EP | 3214244 | A2 * | 9/2017 | E05F 15/565 |
| EP | 3333347 | A1 * | 6/2018 | E05D 15/0686 |
| KR | 100385303 | B1 * | 5/2003 | |
| KR | 100385304 | B1 * | 5/2003 | |
| KR | 100385305 | | 5/2003 | |
| KR | 100402557 | B1 * | 10/2003 | |
| KR | 100402558 | B1 * | 10/2003 | |
| WO | 2015033270 | | 3/2015 | |
| WO | 2017068555 | | 4/2017 | |
| WO | WO-2017108450 | A1 * | 6/2017 | E05D 15/565 |
| WO | WO-2019179853 | A1 * | 9/2019 | E05D 15/565 |

* cited by examiner

MOVEMENT SYSTEM FOR ONE LEAF OF A LIFT-SLIDING DOOR OR LIFT-SLIDING DOOR-WINDOW, AS WELL AS LIFT-SLIDING DOOR OR LIFT-SLIDING DOOR-WINDOW INCLUDING THE MOVEMENT SYSTEM

TECHNICAL FIELD

The present invention generally relates to the technical field of doors and windows and it particularly relates to a system for moving a leaf of a slidable lifting door or door-window, as well as a slidable lifting door or door-window comprising the system.

STATE OF THE ART

There is known the use of slidable lifting doors or door-windows for civil and industrial building industry.

Generally, such doors or door-windows have a slidable lifting leaf provided with wheels which slide in a rail arranged on the floor.

An example of such known doors or door-windows is described in documents DE 102013218948 and EP3940179.

An acknowledged drawback of such doors or door-windows lies in the presence of the rail which occupies the passage door step and tends to rapidly get dirty, with ensuing need for frequent cleaning. Furthermore, foreign bodies can accumulate in the rail impacting against the coating of the wheels of the leaf, with ensuing danger of damage, breakage or malfunctions.

To this end, there have been provided slidable lifting doors or door-windows without rail on the floor. To this end, such doors or door-windows are provided with a guide rail fixed above the slidable lifting leaf, to which the slidable lifting leaf is operatively connected by means of a slidable carriage.

The vertical movement of the leaf is controlled by a movement system which includes a manual actuator provided with handle which interacts with means for lifting/lowering the leaf arranged above the leaf and operatively connected with the guide rail.

The connection between the manual actuator and the lifting/lowering means is carried out using appropriate motion transmission means, generally a kinematic chain.

Some known examples of such known doors or door-windows are described in the international applications WO2017/068555 and WO2015/033270.

Typically, such movement systems are cumbersome and have leaves whose upright has a large thickness, with ensuing weight that is heavy to lift and move.

In addition, uprights with large thicknesses entail a significant reduction of the optically transparent portion of the leaf.

On the other hand, to date there are not known movement systems for such types of doors or door-windows of the electrical type.

SUMMARY OF THE INVENTION

An object of the present invention is to at least partly overcome the drawbacks illustrated above by providing a system for moving a leaf of a slidable lifting door or door-window that is highly efficient and cost-effective.

Another object of the present invention is to provide a movement system which allows to have a leaf with low thickness profiles.

Another object of the present invention is to provide a movement system which allows to have a leaf with high aesthetic appeal.

Another object of the present invention is to provide a movement system which allows to have a leaf that is easy to move.

Another object of the present invention is to provide a movement system that is particularly safe and effective.

A further object of the present invention is to provide a movement system that is easy to assemble.

A further object of the present invention is to provide a movement system that is easy to maintain.

These and other objects which will be more apparent hereinafter, are attained by a lifting system and/or a door or door-window and/or movement means as described, illustrated and/or claimed herein.

Therefore, the movement system of the present invention may essentially include one or more guide rails which can be anchored to a frame of a slidable lifting door or door-window above one or more liftable slidable leaves, means for sliding the leaf slidably engaged in the guide rail, means for moving the leaf and actuator means which can be controlled by a user to control the lifting/lowering of the leaf.

The movement means, which may include means for lifting/lowering the leaf and motion transmission means which can be selectively connected with the actuator means, may allow to move the leaf between a locked lowered closed position, in which the insulating means of the leaf are compressed against the floor so that the sliding thereof is hindered, and an unlocked raised closed position, in which the leaf is free to slide toward one or more open positions.

Suitably, the movement means and the sliding means may be operatively connected so that the leaf slidably support the leaf during the sliding.

Thanks to this characteristic, the slidable lifting door or door-window may be without rail on the floor.

In a preferred but non-exclusive embodiment of the invention, the movement system may further include safety means selectively acting on the movement means, and preferably on the means for lifting/lowering the leaf, to lock the leaf upon reaching the unlocked raised closed position.

The above will allow to slidably move the leaf which is supported, during the sliding, by the relative sliding means.

In addition, the safety means may preferably cooperate with the sliding means to counter the weight of the leaf, so as to keep the leaf in the unlocked raised closed position and hinder the lowering thereof toward the locked lowered closed position.

In an embodiment, the movement system may be manual, wherein the actuator means may be arranged on the frame, preferably exclusively, while the movement means may be arranged on the leaf, preferably exclusively.

This will allow to provide the leaf with low thickness profiles, in particular minimizing the exposed parts thereof, so as to make it easy to move and aesthetically appealing.

As a matter of fact, the actuator means are particularly cumbersome, and the positioning on the frame allows to minimize the overall dimensions thereof. On the other hand, the positioning of the movement means on the leaf allows a simple and quick installation of the door or door-window, as well as easy maintenance.

Furthermore, the actuator and movement means may be suitable to be selectively engaged to each other so that the user can control the vertical movement of the leaf exclusively when the leaf is in the locked lowered and unlocked raised closed positions. On the other hand, the actuator and movement means may be mutually disengaged when the leaf is free to slide.

In a preferred but non-exclusive embodiment of the invention, the movement and actuator means may comprise one or more respective male-female elements which can be selectively engaged with respect to each other when the leaf is in the locked lowered and unlocked raised closed positions and which can be disengaged when the leaf is free to slide between the unlocked raised closed and open positions.

The separation between the actuator and movement means during the free sliding of the leaf actually ensures—in the absence of restrictions—that the weight of the leaf, which can be significantly high, does not return it to the locked lowered closed position.

On the other hand, in an embodiment the movement system may be electrical, wherein the actuator and movement means may be both positioned on the leaf.

It is clear that such a solution will allow to reduce the overall dimensions of the movement system, and it will also allow to reduce the components thereof, hence simplifying assembly, maintenance and reducing wear.

In addition, when the leaf reaches the unlocked raised position, the actuator means and the movement means may be electrically disengaged and the door will be free to translate between the unlocked raised and open positions.

The dependent claims define advantageous embodiments of the invention.

BRIEF DESCRIPTION OF THE DRAWINGS

Further characteristics and advantages of the invention will be more apparent in light of the detailed description of a preferred but non-exclusive embodiment of the invention, illustrated by way of non-limiting example with reference to the attached drawings, wherein: FIGS. 1A, 1B and 1C are axonometric schematic views of a door or door-window D according to the invention, respectively with leaf A locked, unlocked and open, regarding which

FIG. 4 is an axonometric schematic view of the complete movement system 1, regarding which

FIGS. 8A and 8B are front cross-sectional views of a first embodiment of the lifting and lowering means of the leaf A, regarding which

FIG. 12B is a front cross-sectional schematic view of the lifting and lowering means 40 with two integrally joined carriages 11, regarding which FIG. 12C is the enlargement of a detail;

FIGS. 15A and 15B are axonometric schematic views of the movement system 1 in electric version with a linear actuator 21 positioned on the crosspiece T2 of the leaf A, regarding which

FIGS. 16A, 16B are front and axonometric cross-sectional views of the guide mechanism 80 at the open leaf A, regarding which

FIG. 20A is a front cross-sectional view of the guide mechanism 80 at the leaf A in locked closed position, regarding which

DETAILED DESCRIPTION OF SOME PREFERRED EMBODIMENTS

Figure 1B:
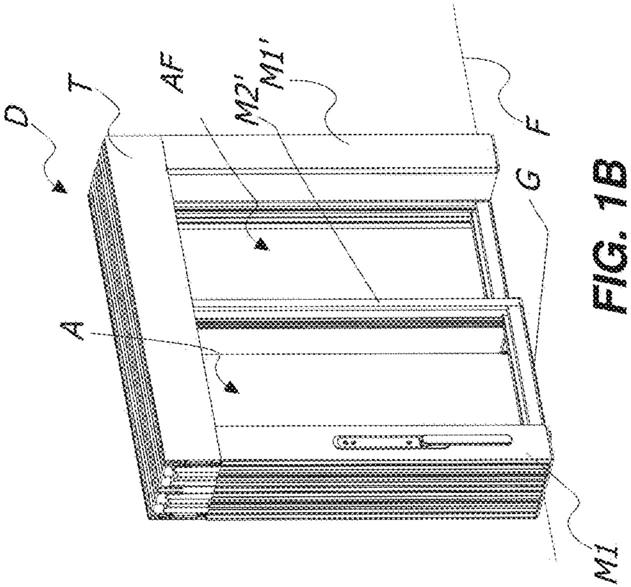

With reference to the attached figures, herein described is a movement system 1 for a liftable slidable leaf A of a slidable lifting door or door-window D.

In particular, FIGS. 1A to 7 and 13A refer to a manual version of the movement system 1, FIGS. 14 to 15D and 21A to 21C refer to an electric version of the movement system 1, while FIGS. 8A to 12C and 16A to 20C refer to both the manual and electric versions of the movement system 1.

The slidable lifting door or door-window D may include at least one slidable leaf A and a fixed or slidable leaf µF in a stationary support structure, such as for example a wall facing a floor F.

It is clear that although in the description outlined hereinafter reference will be made to a stationary support structure in the form of a wall, other types of stationary support structures may be considered without departing from the scope of protection of the attached claims.

Preferably, the leaves A and AF may be suitable to be anchored to a frame T which can be fixed to the same stationary support structure.

In a per se known manner, the leaf A may comprise an insulated glazing inserted into a pair of uprights M2 and M2' and two crosspieces T2 and T2', while the frame T may include a pair of uprights M1 and M1' and a crosspiece T1.

The leaf A may include insulating means, for example insulating elements in the form of gaskets of the per se known type, positioned along the perimeter of the same leaf A.

In particular, the insulating means may include the insulating elements G which can be arranged facing the floor F.

Suitably, the insulating elements G will be compressed when the leaf A rests against the floor F so as to ensure an airtight and/or soundproof and/or watertight sealing, thermally and/or acoustically and/or hydraulically insulating the internal environment from the external environment.

Therefore, the system 1 may move the leaf A between a locked lowered closed position, hereinafter identified with locked position and for example shown in FIGS. 1A and 21A, in which the insulating elements G are compressed against the floor F so as to prevent the sliding of the leaf A, an unlocked raised closed position, hereinafter simply identified with unlocked position and for example shown in FIGS. 1B and 21B, and one or more open positions, for example shown in FIGS. 1C and 21C.

In particular, the leaf A may freely slide between the unlocked and open positions. Described below are two versions of the movement system 1, that is a manual version and an electric version.

Both versions may include a guide rail 10 which can be anchored to the frame T which extends along an axis X, which may be substantially horizontal.

In particular, the rail 10 may be positioned on the upper part of the frame T, for example on the crosspiece T1.

Therefore, the rail 10 may be arranged facing the crosspiece T2 of the leaf A.

Furthermore, the system 1 may include sliding means 11, for example a carriage, which slide along the rail 10 to allow the translation of the leaf A along the leaf A.

Figure 12A:
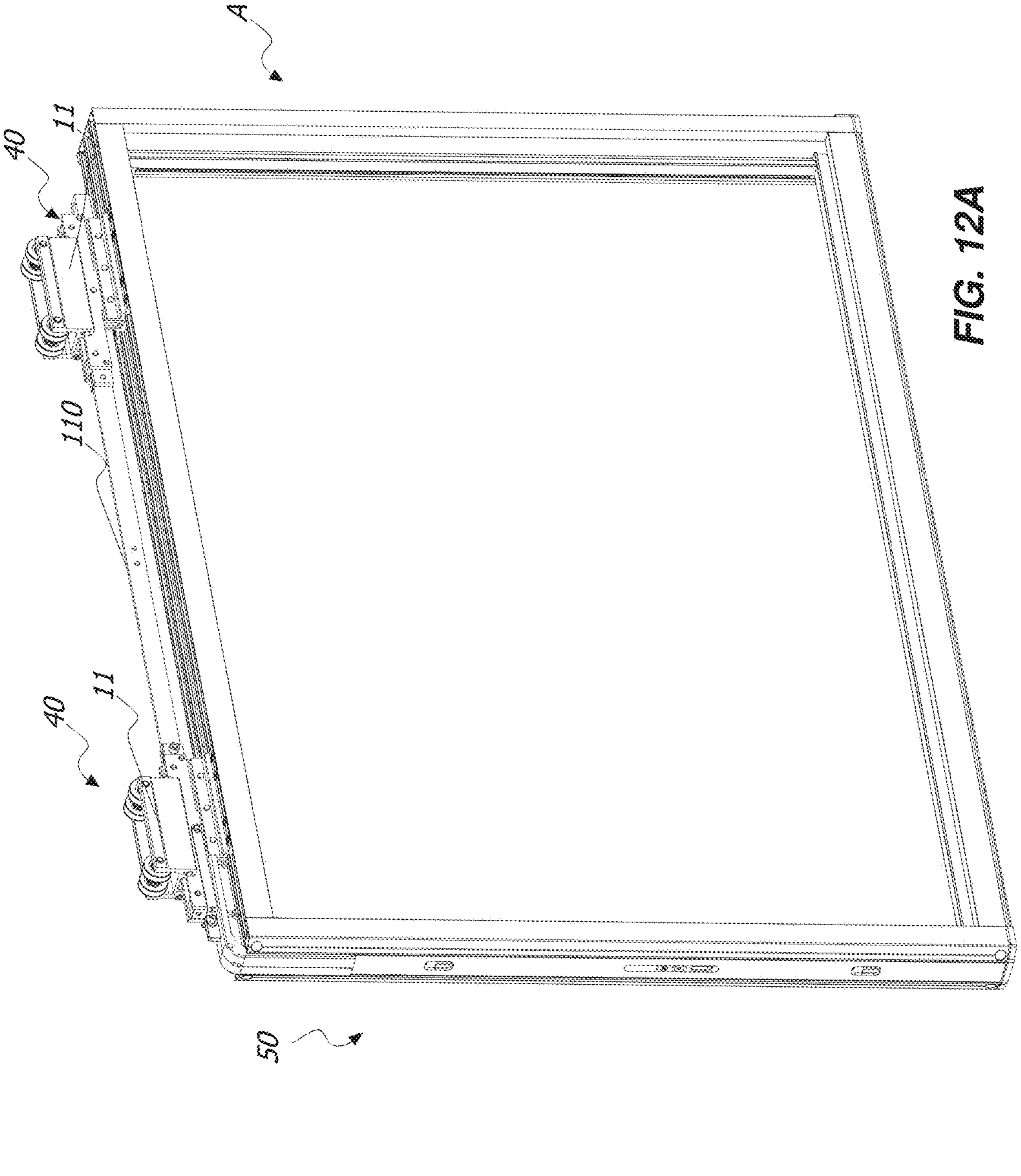
FIG. 12A is an axonometric schematic view of the lifting and lowering means 40 with two integrally joined carriages 11.
Figures 12B, 13C:
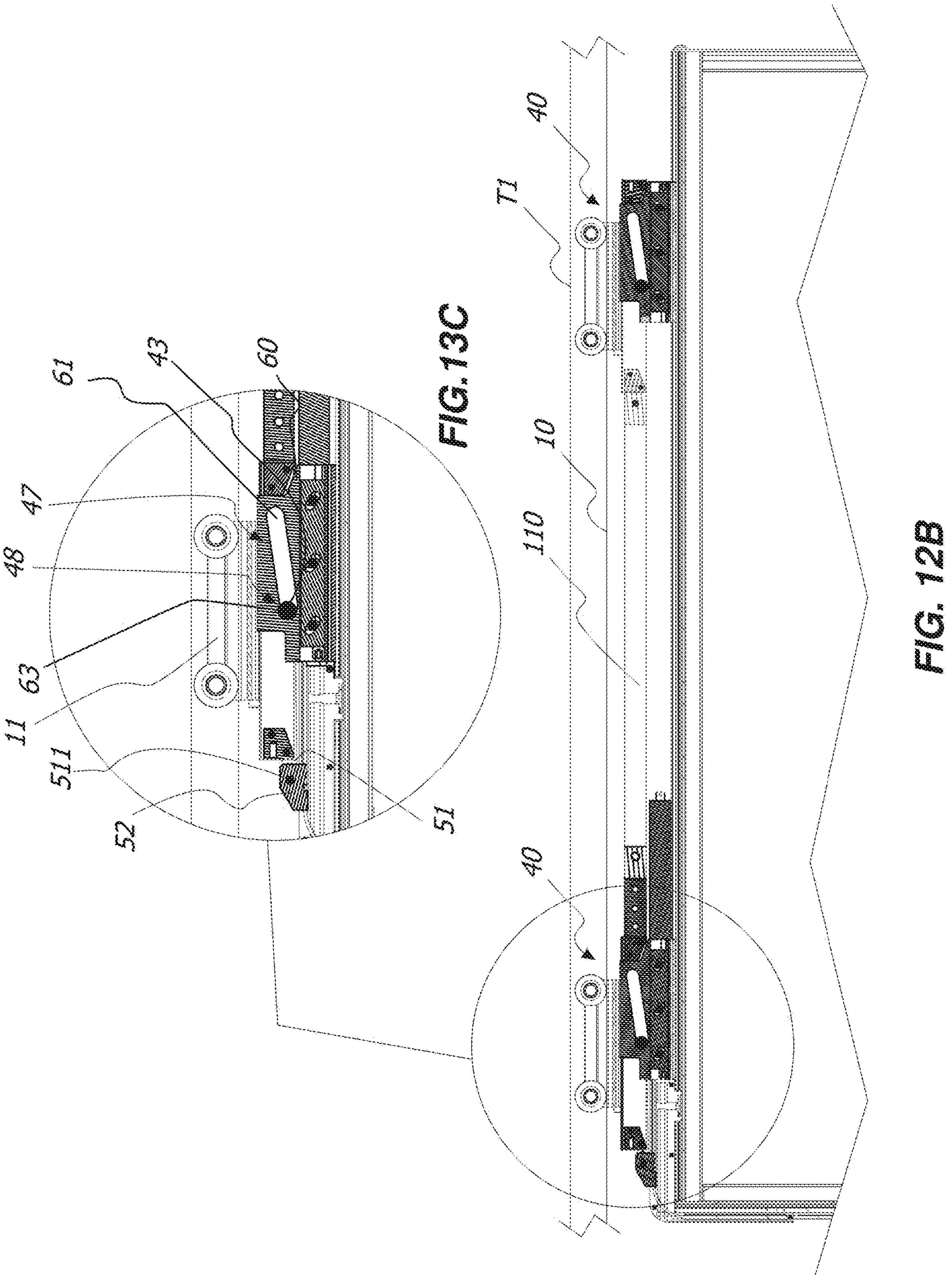

Furthermore, it is clear that the sliding means 11, as particularly shown in FIG. 12A, may include two or more carriages rigidly connected to each other for example using a rod 110, which slide along the rail 10 in an integrally joined fashion. In this case, the movement of one of the carriages will cause the movement even of the others connected thereto.

Although in the description hereinafter the sliding means will be in the form of a carriage 11, it is however clear that the sliding means may be other types without departing from the scope of protection of the attached claims.

Preferably, the system 1 may include movement means 30 of the leaf A to move it between the locked position and the unlocked position.

The movement means 30 and the carriage 11 may therefore be connected so that the carriage 11 supports the leaf A during the sliding once lifted, as explained in greater detail below.

Suitably, the system 1 may include actuator means 20 which can be engaged with the movement means 30 to move the leaf A between the locked position and the unlocked position.

Specifically, when the leaf A is in open position or during the sliding, the actuator means 20 and the movement means 30 will not be engaged to each other.

Preferably, the movement means 30 may include means for lifting and lowering the leaf A.

In particular, the lifting and lowering means 40 may have a first portion integrally joined with the leaf A and a second portion integrally joined with the carriage 11. The first portion is part of leaf A or a structure attached thereto, and the second portion is part of sliding means 11.

Basically, the control of the actuator means 20 by the user will cause the movement of the movement means 30 as well as the relative movement of the first and second portions.

In this manner the user may control the movement of the leaf A between a first operative position corresponding to the locked position of the leaf A and a second operative position corresponding to the unlocked position of the leaf A.

Figure 8C:
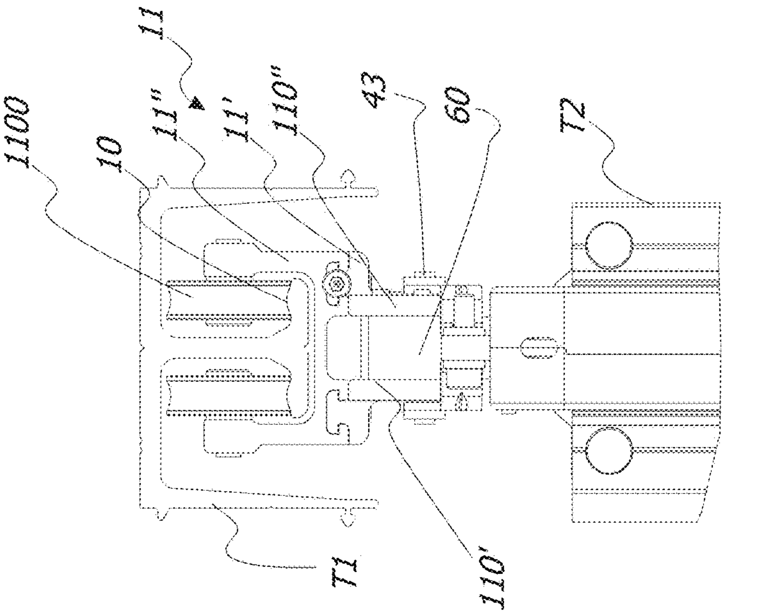
FIG. 8C is a lateral schematic view.
Figure 8A:
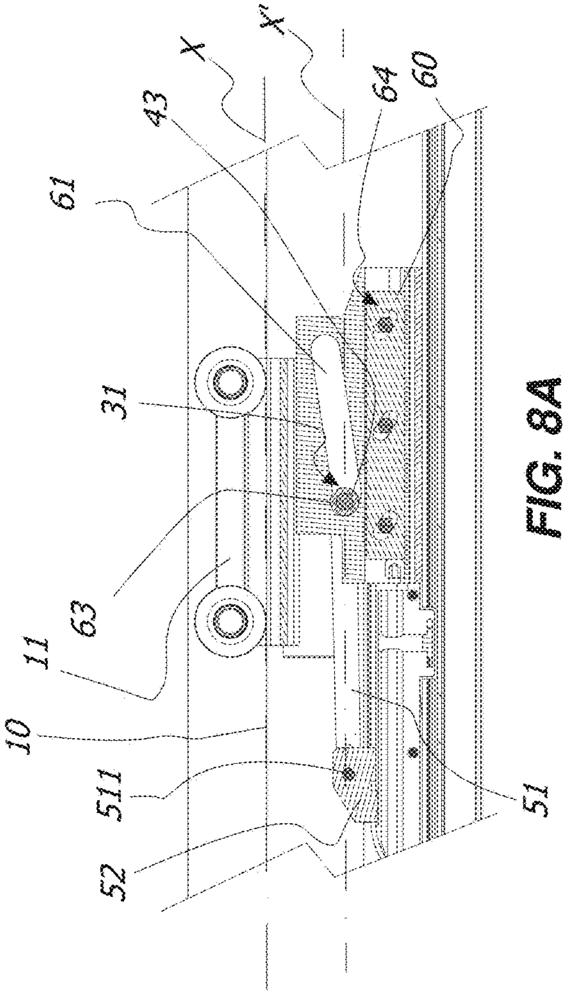
Figure 8B:
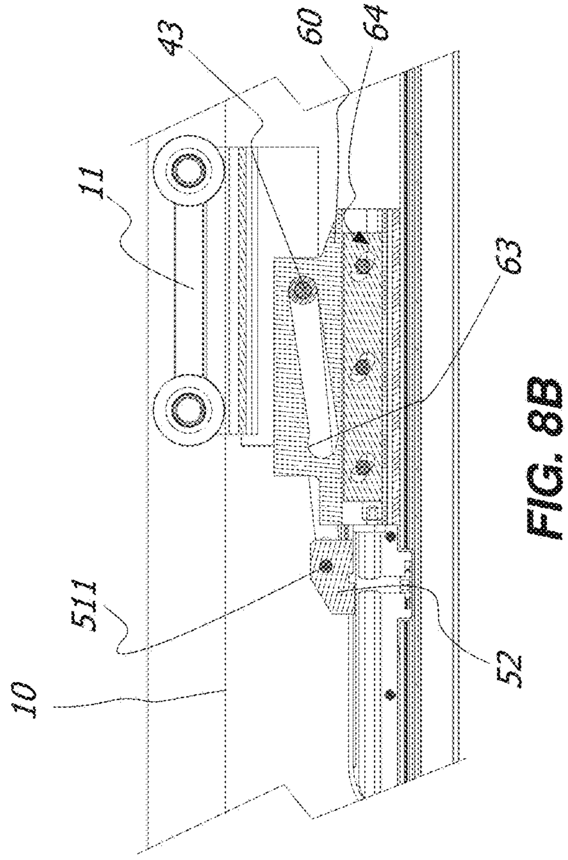

In a first configuration particularly shown in FIGS. 8A and 8B, the lifting and lowering means 40 may comprise an interface element 60, for example in the form of a square, integrally joined with the leaf A.

Although in the description hereinafter the interface element 60 will be identified with a square 60, the interface element may also be of any other type without departing from the scope of protection of the attached claims.

In addition, the carriage 11 may include an upper portion 11" with wheels 1100 slidable on the rail 10 in a per se known manner.

Furthermore, the carriage 11 may include a lower portion 11' with a pair of brackets 110' and 110" facing each other.

Preferably, the brackets 110' and 110" and the upper portion 11" will define a U-shaped housing.

Therefore, it is clear that the brackets 110' and 110" may be sufficiently spaced apart for the insertion of the aforementioned square 60 between them, in particular in the U-shaped housing.

As a matter of fact, the brackets 110' and 110" may guide the sliding of the square 60 during the sliding and lowering of the leaf A.

Suitably, the portions 11' and 11" will be coupled to each other, for example by means of shape coupling.

In addition, the brackets 110' and 110" may include a pair of through holes faced to which there may be pivoted a slider 43.

Preferably, the square 60 may include a slot 61 with two inclined zones 63 and 47, preferably consecutive.

Therefore, it is clear that the first portion of the lifting and lowering means 40 is integrally joined with the leaf A, as well as the zone of the slot 61 involved in lifting and lowering the leaf A.

In particular, the zones 63 and 47 may have a different inclination so that they are mutually incident and with respect to the axis X.

However, it is clear that the inclined zones 63 and 47 they may not be consecutive, that is there may be a zone interposed between them, without departing from the scope of protection of the attached claims.

On the other hand, the lifting and lowering means 40 may include the aforementioned slider 43 slidable in the zone 47.

In this manner, the slider 43 may define the portion 48.

In particular, the linear movement of the slider 43, that is of the portion 48, along an axis X' parallel to the axis X in a determined direction may allow the movement of the leaf A from the locked position to the unlocked position, while the movement of the slider 43 in the opposite direction will allow the movement of the leaf A from the unlocked position to the locked position.

As a matter of fact, the constraining reaction developed by the interaction between the slider 43 and the zone 47 will cause the lifting of the leaf A.

Figure 9A:
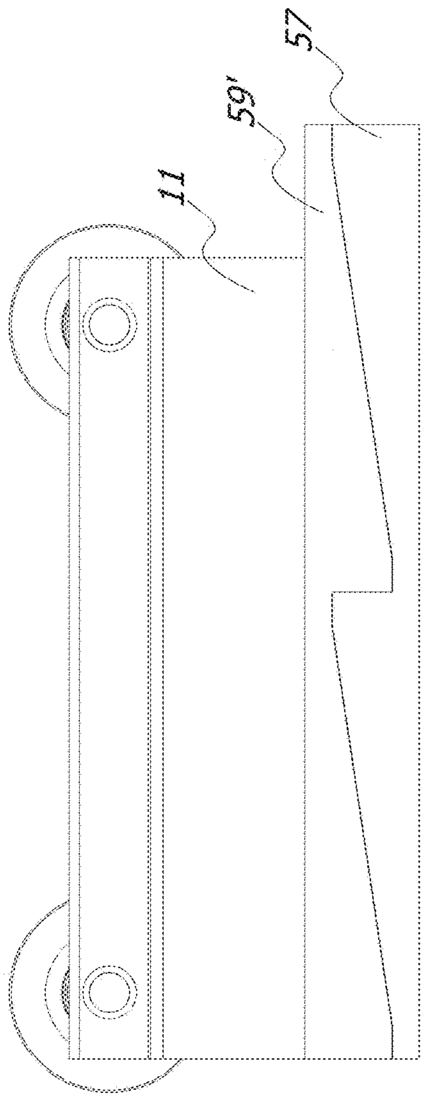
FIGS. 9A and 9B, 10A and 10B, 11A and 11B are front schematic views of a second, third and fourth embodiment of the lifting and lowering means of the leaf A respectively with leaf A unlocked and locked.
Figure 9B:
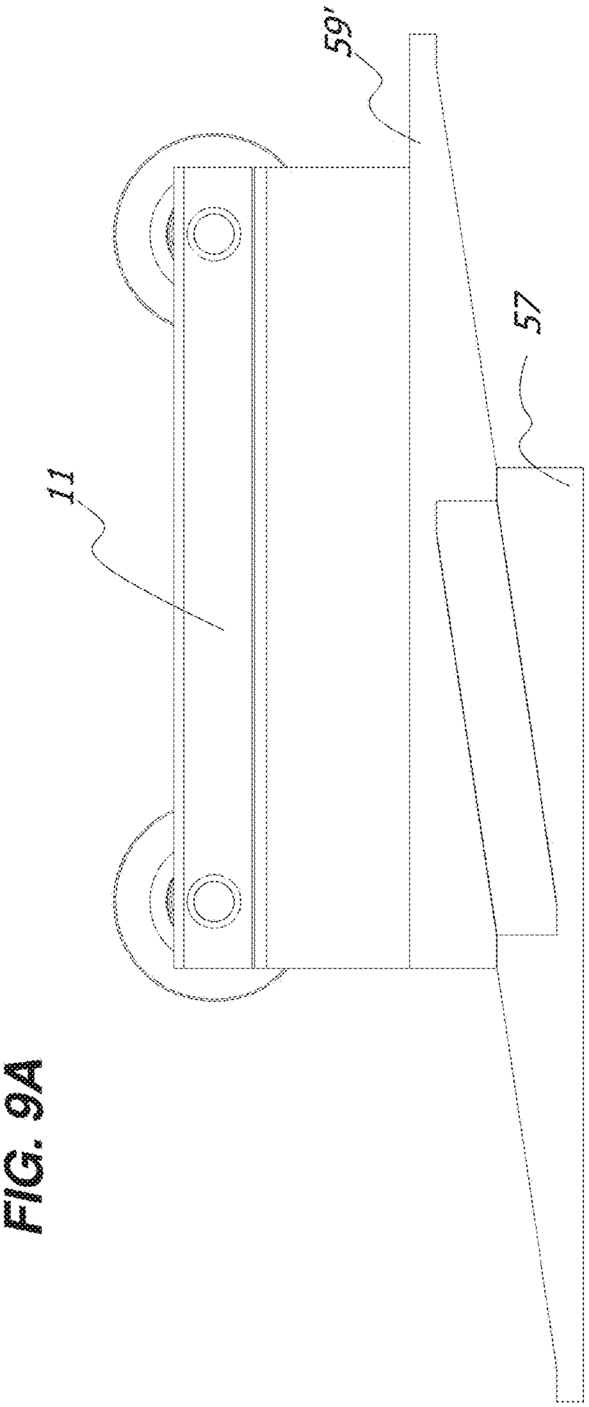
Figure 10A:
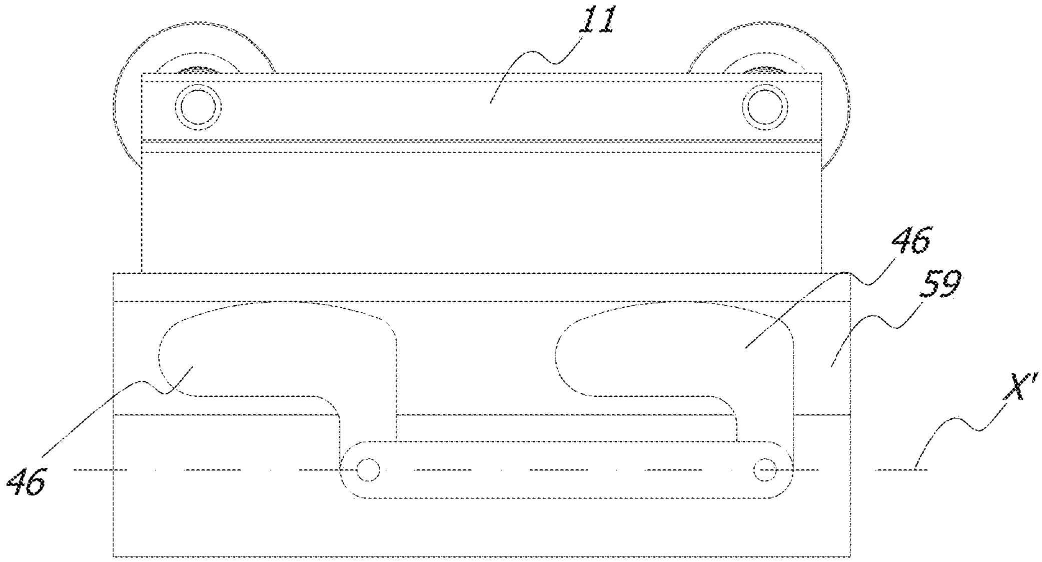
Figure 10B:
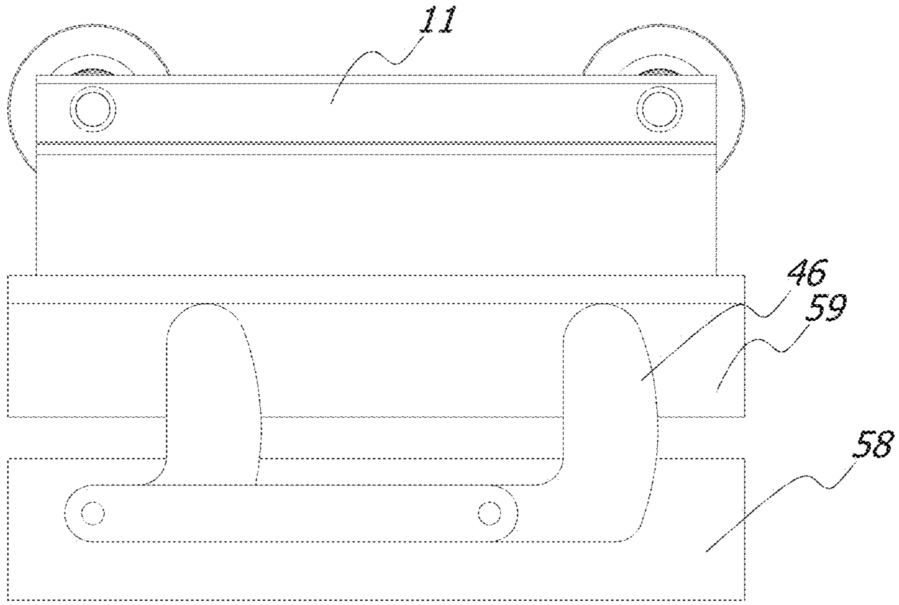
Figure 11A:
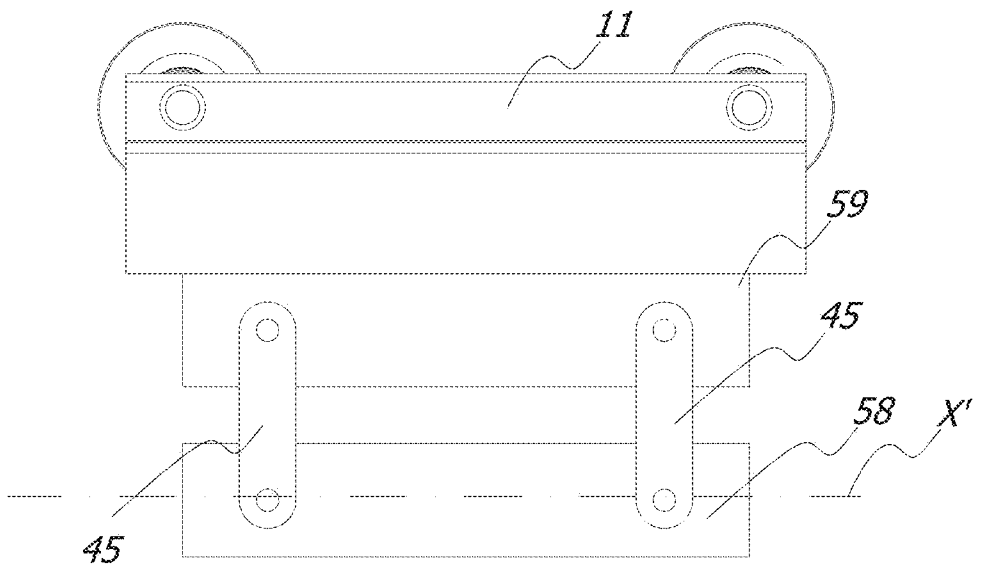
Figure 11B:
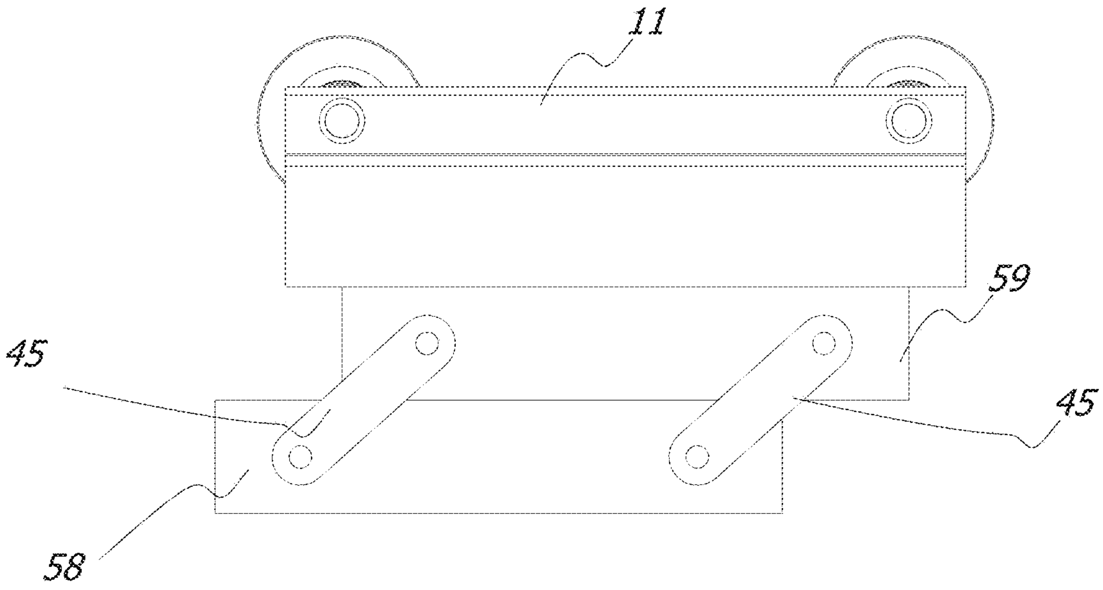

In a second configuration particularly shown in FIGS. 9*a* and 9B, the lifting and lowering means 40 may comprise a pair of inclined planes 57 and 59' respectively including the first portion and the second portion.

More particularly, the inclined planes 57 and 59' may be constrained to each other in a per se known manner so that the movement of one causes the relative movement of the first and second portions.

In a third and fourth configuration particularly shown in FIGS. 10A to 11B, the lifting and lowering means 40 may include two longitudinal elements 58 and 59 respectively integrally joined with the leaf A and with the sliding means 11.

Therefore, the element 58 may include the first portion while the element 59 may include the second portion.

In this case, the lifting and lowering means 40 may include one or more levers 45 or cams 46 constraining the two elements 58 and 59.

Specifically, the levers 45 and the cams 46 may be pivoted at the elements 59 and they may rotate around an axis perpendicular to the axis X.

In particular, the linear movement of the first portion along the axis X' will cause the rotation of the levers 45 or of the cams 46 around the aforementioned axis perpendicular to the axis X, as well as the lifting of the leaf A.

Even in this case, the rotation of the levers 45 or cams 46 in clockwise or anti-clockwise direction will allow the movement of the leaf A from the unlocked position to the locked position and vice versa at a rotation in the opposite direction.

Preferably, the system 1 may include safety means 31 which may act on the movement means 30 to lock the leaf A when it reaches the unlocked position, so as to counter the return thereof to the locked position under the thrust of its weight.

Specifically, the safety means 31 may act on the first and second portions so as to lock them in the second operative position.

For example, in the first configuration, the interaction between the zone 63 and the slider 43 will generate a force such to oppose the return of the first and second portions to the first operative position.

In addition, the square 60 may include further safety means 64, for example longitudinal slots with an inclination defining an incident direction with respect to the extension of the zone 47.

On the other hand, in the second, third and fourth configuration, the first and second portions may include a constraint suitable to lock them in the second operative position.

According to an aspect of the invention, the system 1 may include a guide mechanism 80.

In particular, the guide mechanism 80 will allow to prevent possible oscillations of the leaf A for example under the thrust of the wind or a sudden movement thereof, as well as for leaves A with particularly large dimensions.

In addition, the guide mechanism 80 may also serve as an anti-break-in mechanism as shown below.

Preferably, the guide mechanism 80 may include a magnetic dowel 81 which can be inserted—for example in a dropping fashion—along an axis Z perpendicular to the axis X, as well as concealably in a special housing 82 positioned in a support body 83 in turn positioned at the floor F, preferably flush.

In this manner, the dowel 81 may be easy to remove to allow the cleaning thereof.

Preferably, the dowel 81 may have a longitudinal hollow body 81', for example cylindrical, containing a magnet 81" and a head 810.

The head 810 may have a cross-section with greater extension with respect to the cross-section of the body 81'.

This means that the head 810 may have a protruding edge 810'.

On the other hand, the mechanism 80 may include an abutment element 84 for the magnetic dowel 81.

The abutment element 84 may include a support 85 flush-inserted into a hollow zone B1 of the lower edge B of the leaf A, preferably at the end facing the upright M1.

The abutment element 84 may further include a metal plate 86 connected to the support 85 by means of a spring 87, facing the dowel 81 and with a movable end 86' protruding from the edge B and an opposite end 86" fixed in the zone B1.

In particular, the spring 87 will allow the plate 86 to move between a position proximal to the support 85 and one distal thereto, respectively at the locked position, wherein the spring is compressed given that the edge B1 rests on the floor F, and at the unlocked or open position.

Figure 16B:
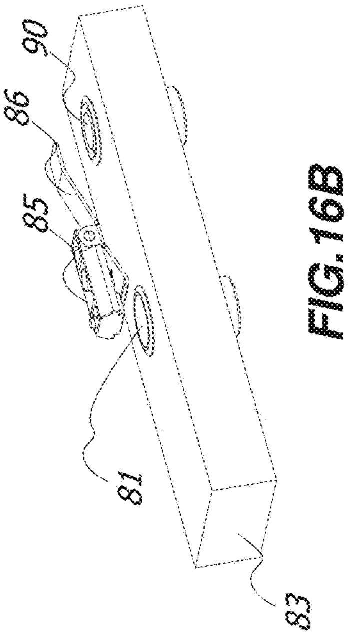
Figure 16D:
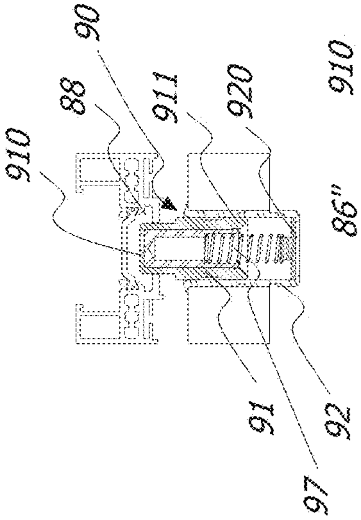
FIGS. 16C, 16D are lateral cross-sectional views of the mechanism of FIG. 16A at the magnetic dowel 81 and at the telescopic pivot 90.
Figure 16A:
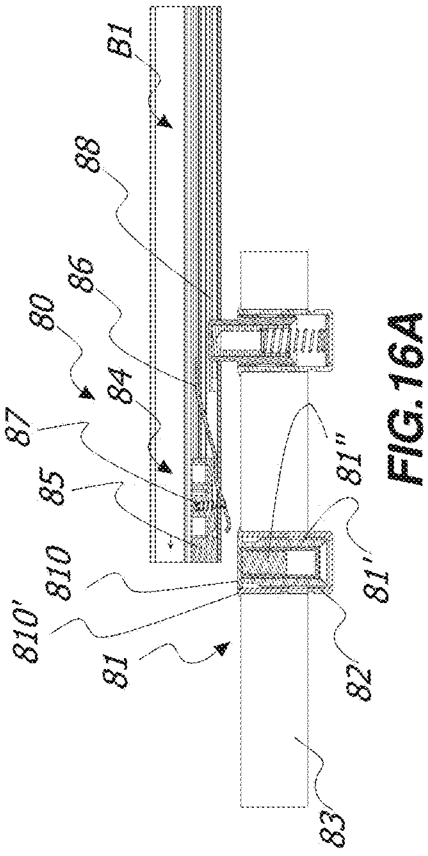
Figure 16C:
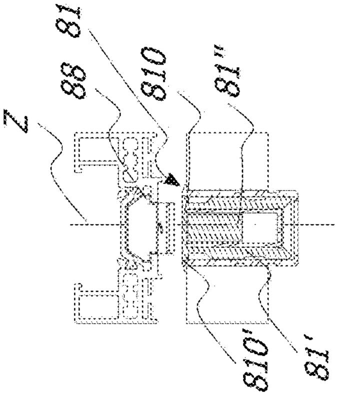
Figure 17A:
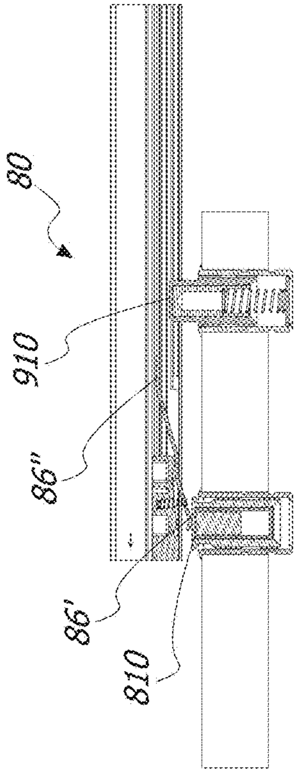
Figure 18B:
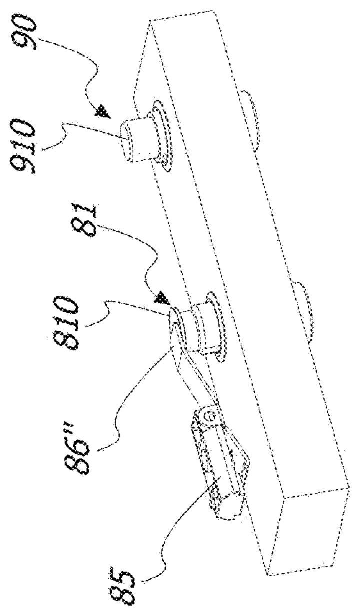
FIGS. 18A, 18B are front and axonometric cross-sectional views of the guide mechanism 80 at the leaf A sliding towards the unlocked closed position.
Figure 19:
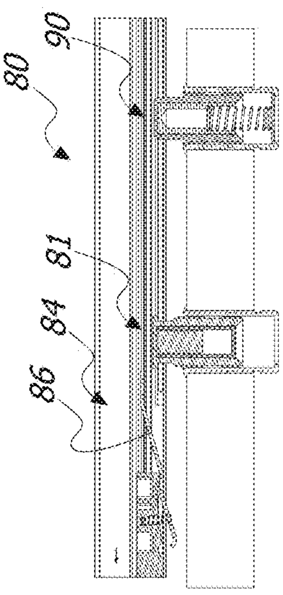
FIG. 19 is a front cross-sectional view of the guide mechanism 80 at the leaf A in unlocked closed position.
Figure 18A:
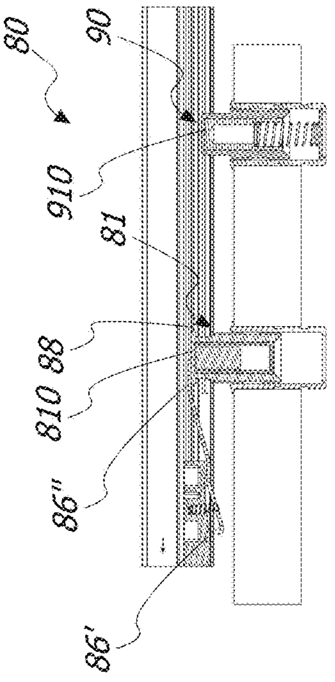

Specifically, during the sliding of the leaf A from the open position, corresponding to the FIG. 16A, to the unlocked position, corresponding to the FIG. 19, the end 86' and then magnet 81" will be mutually attracted so as to facilitate the exit of the dowel 81 from the housing 82.

The sliding of the leaf A will therefore cause the sliding of the head 810 and of the plate 86, at the end of which the protruding edge 810' will be suitable to be inserted into special guides 88 obtained in the cavity B1 and particularly shown in FIG. 16A.

It is therefore clear that the protruding edge 810' may prevent the dowel 81 from slipping off from the guides 88.

Figure 20C:
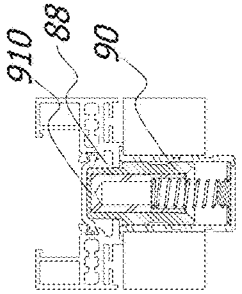
FIGS. 20B, 20C are lateral cross-sectional views of the mechanism of FIG. 20A at the magnetic dowel 81 and at the telescopic pivot 90.
Figure 20B:
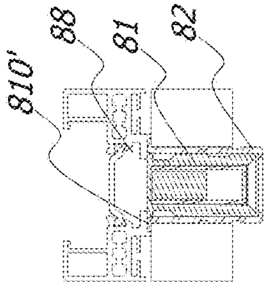
Figure 20A:
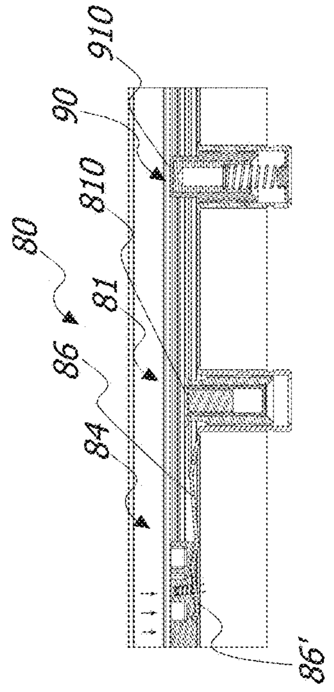

At the locked position, particularly shown in FIG. 20A, the end 86' will therefore be proximal to the support 85, while the dowel 81 may slide along the axis Z so as to be at least partially recessed into the housing 82.

In addition, the guide mechanism 80 may include an optional telescopic guide pivot 90 with a longitudinal body 91, for example cylindrical, having a bottom wall 911 and a head 910 inserted into the guides 88.

The body 91 may be inserted into a housing 92 with a bottom wall 920 and obtained in the support 83 and it may move along an axis parallel to the axis Z under the thrust of a spring 97 connected to the bottom wall 920 and inserted into the body 91 through the bottom wall 911.

As shown in FIGS. 16A to 20A it is clear that during the entire movement of the leaf A, the head 910 will be constantly inserted into the guides 88 under the thrust of the spring 97.

In this manner, such pin 90 will not only act as a guide for the leaf A but also as a security anti-break-in mechanism.

Below is the description of the embodiment of the manual movement system 1, particularly shown in FIGS. 1A to 7.

In such version, the movement means 30 may include the lifting and lowering means 40 of the leaf A.

Furthermore, the movement means 30 may include motion transmission means 50 connected with the actuator means 20 and the lifting and lowering means 40.

In particular, the motion transmission means 50 may be interposed between the actuator means 20 and the lifting and lowering means 40 to transmit to the lifting and lowering means 40 the control imparted by the user through the actuator means 40.

Specifically, the movement means 50 may be connected with the portion 48.

In this manner, the movement of the means 50 will specifically allow the relative movement of the first and second portions between the first and second operative position, as well as the movement of the leaf A between the locked and unlocked position.

Preferably, the actuator means 20 may for example be a handle 23 which can be positioned at the leaf A or at the frame T and which can be gripped by the user.

In a preferred but non-exclusive embodiment, the actuator means 20 may be suitable to be positioned exclusively at the frame T, while the movement means 30 may be suitable to be positioned exclusively on the leaf A.

This will allow to reduce the overall dimensions of the profiles of the leaf A, in particular the exposed parts thereof, allowing a significant decrease in their thickness, as well as the weight of the leaf A to be supported and moved.

Although in the description hereinafter there will be described the actuator means 20 in the form of a handle 23 which can be rotated by a user, it is however clear that they may also be of any other type without departing from the scope of protection of the attached claims.

Figure 13B:
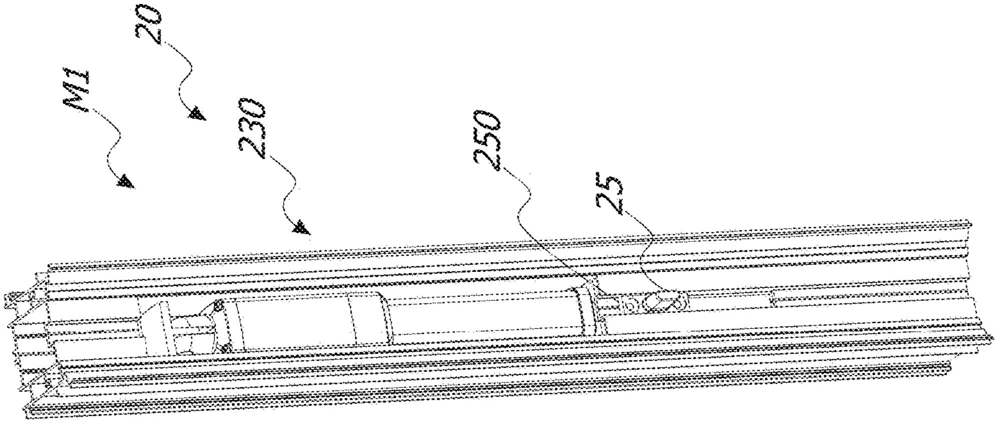
FIGS. 13A and 13B are respectively a lateral cross-sectional view along a longitudinal plane and an axonometric view of an electric actuator 230 in the manual version.
Figure 13A:
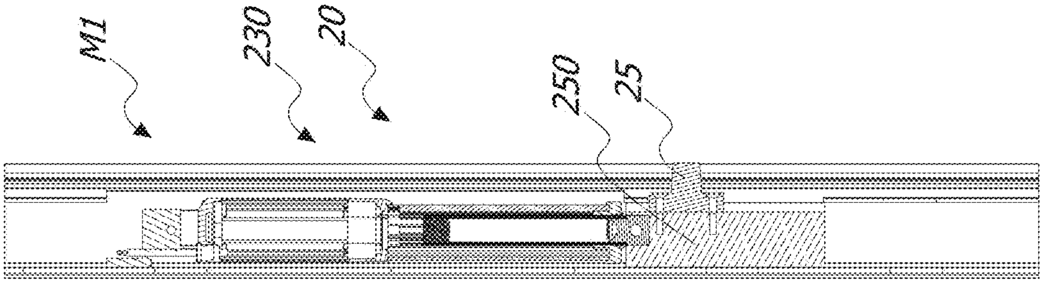

For example, the actuator means 20 may be in the form of an electric motor 230, shown in FIGS. 13A and 13B, connected with the power supply and an appropriate push-button panel which can be controlled by a user in a per se known manner, wherein the electric motor 230 may be inserted into the frame T, for example at the upright M1, connected with the movement means 50.

Figure 1A:
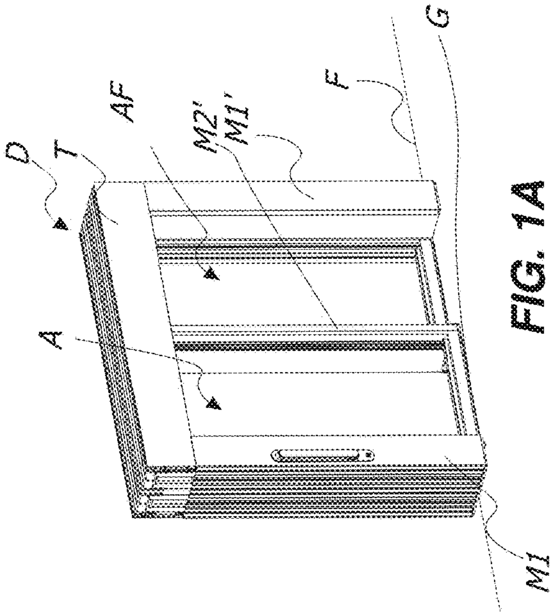

According to the preferred embodiment mentioned above, the handle 23 may be positioned on the upright M1 of the frame T so as to face the corresponding upright M2 of the leaf A, as particularly shown in FIG. 1A.

The user may therefore control the lifting of the leaf A by rotating the handle 23 around an axis Y perpendicular to the axis X.

Figure 3A:
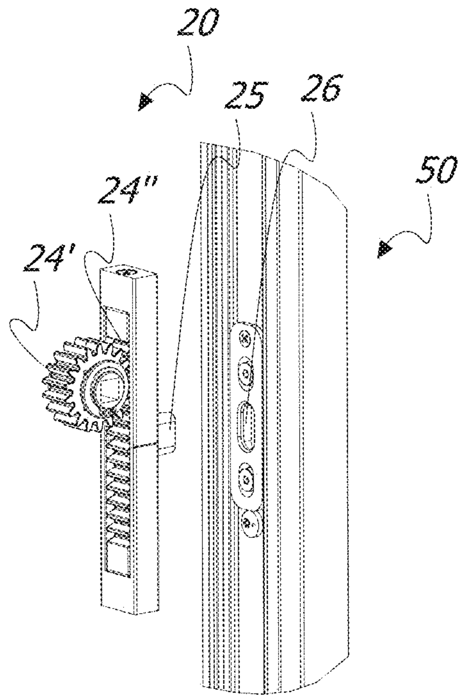
FIGS. 3A and 3B are axonometric schematic views of the interaction between the actuator means 20 and the motion transmission mechanism 50.
Figure 3B:
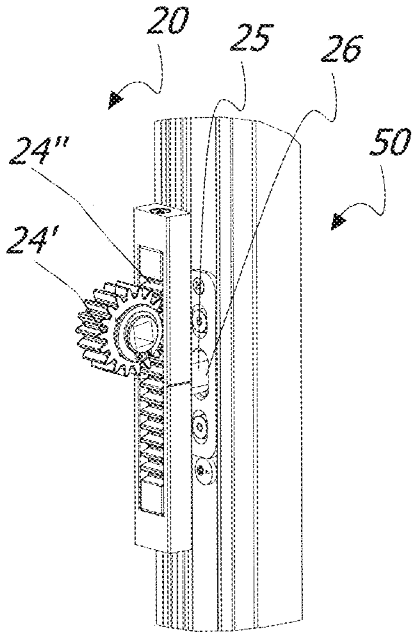
Figure 6:
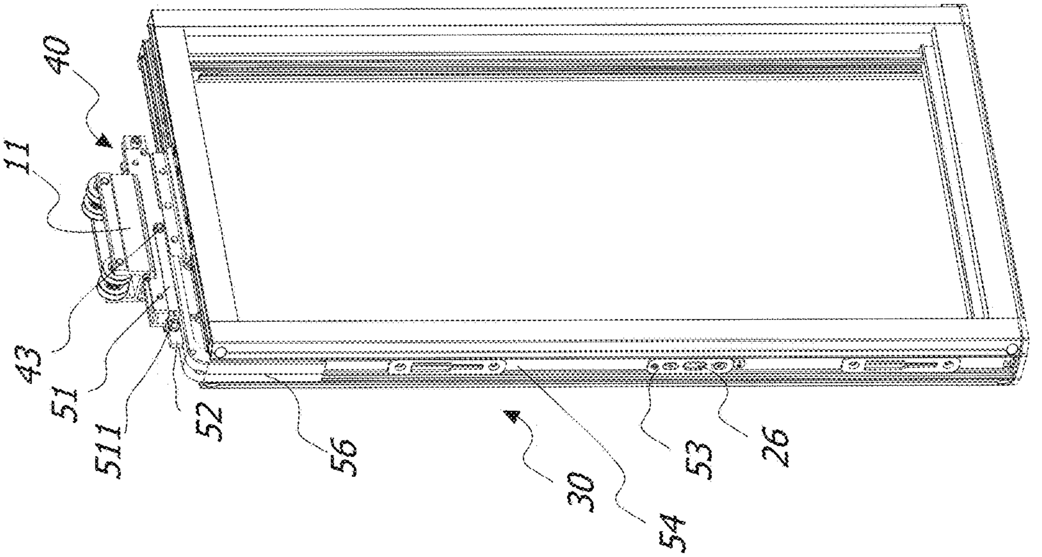
FIGS. 5 and 6 are views of some details.
Figure 5:
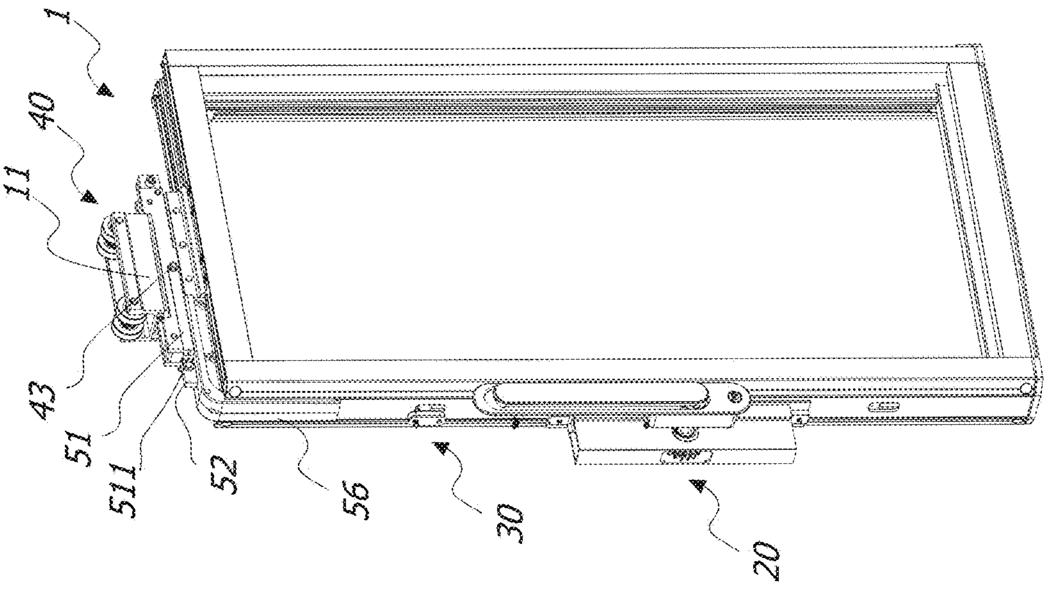

As shown in FIGS. 3A and 3B, the actuator means 20 may include a rack and pinion mechanism having a rack 24' and a pinion 24", the rack and pinion mechanism being inserted into the upright M1.

Figure 7:
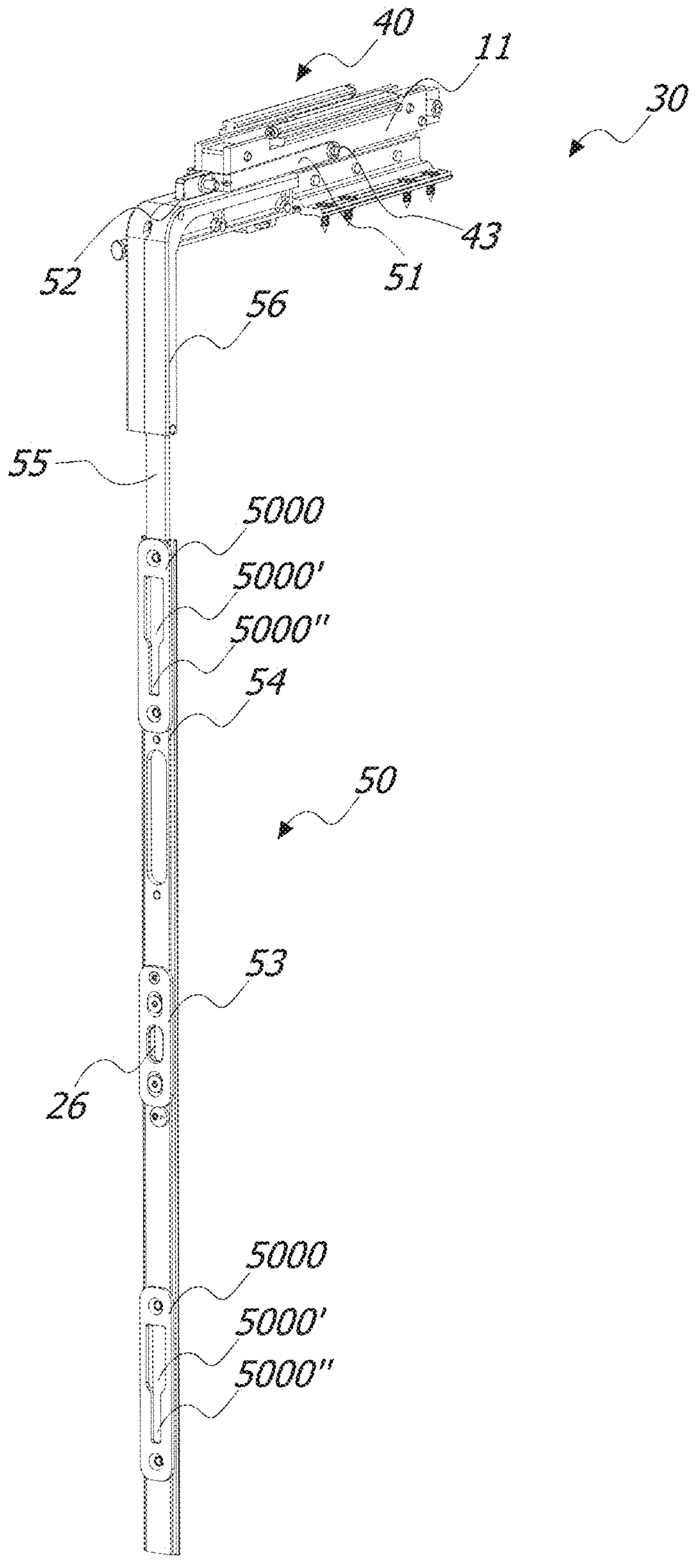
FIG. 7 is an axonometric schematic view of the movement means 30.

In addition, as shown in FIGS. 7, 13A, 13B, the actuator means 20 may include a male element 25, which can be engaged with a female element 26 of the motion transmission means 50 when the leaf A is in the locked position.

However, it is clear that also the contrary may occur without departing from the scope of protection of the attached claims.

The male element 25 may for example be a slider integrally joined with the rack and pinion 24", where present.

In this manner, the movement of the rack and pinion 24" will cause the movement of the slider 25.

On the other hand, the movement means 30, specifically the motion transmission means 50, may include striker plate 53 which includes the female element 26, for example an opening obtained therein.

Specifically, the slider 25 may be engaged in the respective opening 26 respectively in a direction parallel to the axis X, along an axis X'".

On the other hand, it is clear that should the actuator means 20 instead comprise an electric motor 230, which may be connected to the slider 25, for example by means of a dowel 250 interposed between them, as shown in FIGS. 13A and 13B.

In addition, the motion transmission means 50 may include a pair of closing elements 5000, for example in the form of striker plates, each with a pair of slots 5000' and 5000" with different width.

In particular, the lower slot 5000" may have a width smaller than the slot 5000'.

It is clear that the motion transmission means 50 may include one or more closing elements 5000, for example one, two, three, four and so on and so forth, without departing from the scope of protection of the attached claims.

Furthermore, the actuator means 20 may include two sliders, for example in the form of studs, which can be engaged in the respective closing elements 5000.

It is clear that the actuator means 20 may include one or more sliders, one, two, three, four and so on and so forth, which can be engaged with respective closing elements 5000 without departing from the scope of protection of the attached claims.

Specifically, the sliders may be engaged in the slots 5000' at the unlocked position, while the sliders may be engaged in the slots 5000" at the locked position.

Such solution will mechanically lock the leaf A in the locked position, cooperating with the action of the weight force thereof.

Preferably, as shown in FIG. 7, the motion transmission means 50 may therefore include—in succession—a first closing element 5000, the striker plate 53, a connection rod 54, a second closing element 5000, one or more strips 55, an angular guide 56, a slide 52 and possibly a slidable element 51 connected with the lifting and lowering means 40.

For example, the closing elements 5000, the striker plate 53 and the connection rod 54 may be positioned along the edge of the upright M2, the strips 55 may be positioned at the corner of the leaf A by means of the angular guide 56, while the slide 52 and the slidable element 51 may be positioned along the edge of the crosspiece T2 and be concealed by the crosspiece T1.

In a first example, such slidable element 51 may be a connecting rod, as shown in FIG. 7.

Suitably, the slidable element 51 may include a foot 511 connected with the slide 52 and a head to the slider 43.

Therefore, the foot 511 may be connected with the female element 26 so as to transmit the motion from the actuator means 20 to the slider 43.

From an operative point of view, when the leaf A is in locked position, the user may move the handle 23 by rotating it around the axis Y, for example clockwise, or otherwise by actuating the aforementioned motor 230, so that the slider 25 engaged in the opening 26 drives the leaf A along a direction perpendicular to the axes X and Y, toward the floor.

Such action will cause the translation of the striker plate 53, of the connection rod 54 and of part of the strips 55 along a direction perpendicular to the axis X and the translation of the remaining strips 55, of the slide 52 and of the slidable element 51 along a direction parallel to the leaf A.

Therefore, the slider 43 may slide in the zone 47 to impact against it, move the first portion from the first to the second operative position and allow the unlocking, that is the lifting of the leaf A.

In such position, the safety means 31 may lock the first portion at the second operative position to allow the translation of the leaf A.

On the other hand, the movement described above may also occur on the contrary so as to allow the locking of the leaf A from the unlocked position to the locked position.

Below is the description of the embodiment of the electric movement system 1, particularly shown in FIG. 15A.

In such embodiment, the actuator means 20 may be electric.

Specifically, the actuator means 20 may be exclusively electric.

For example, the actuator means 20 may be suitable to be controlled by a user in wireless mode or there may be provided for a specific circuitry which electrically connects them with an actuation push-button panel, for example positioned at the wall.

To this end, the actuator means 20 may be power-supplied by means of electrical power supply means 70, which may possibly include a buffer battery 73, only when the leaf A is in locked or unlocked position to move it between the one and the other.

In other words, when the leaf A slides between the unlocked position and the open position, the electrical power supply means 70 do not power-supply the actuator means 20.

Suitably, there may be provided for at least one male electrical connector 71 and one female electrical connector 72.

Figure 15A:
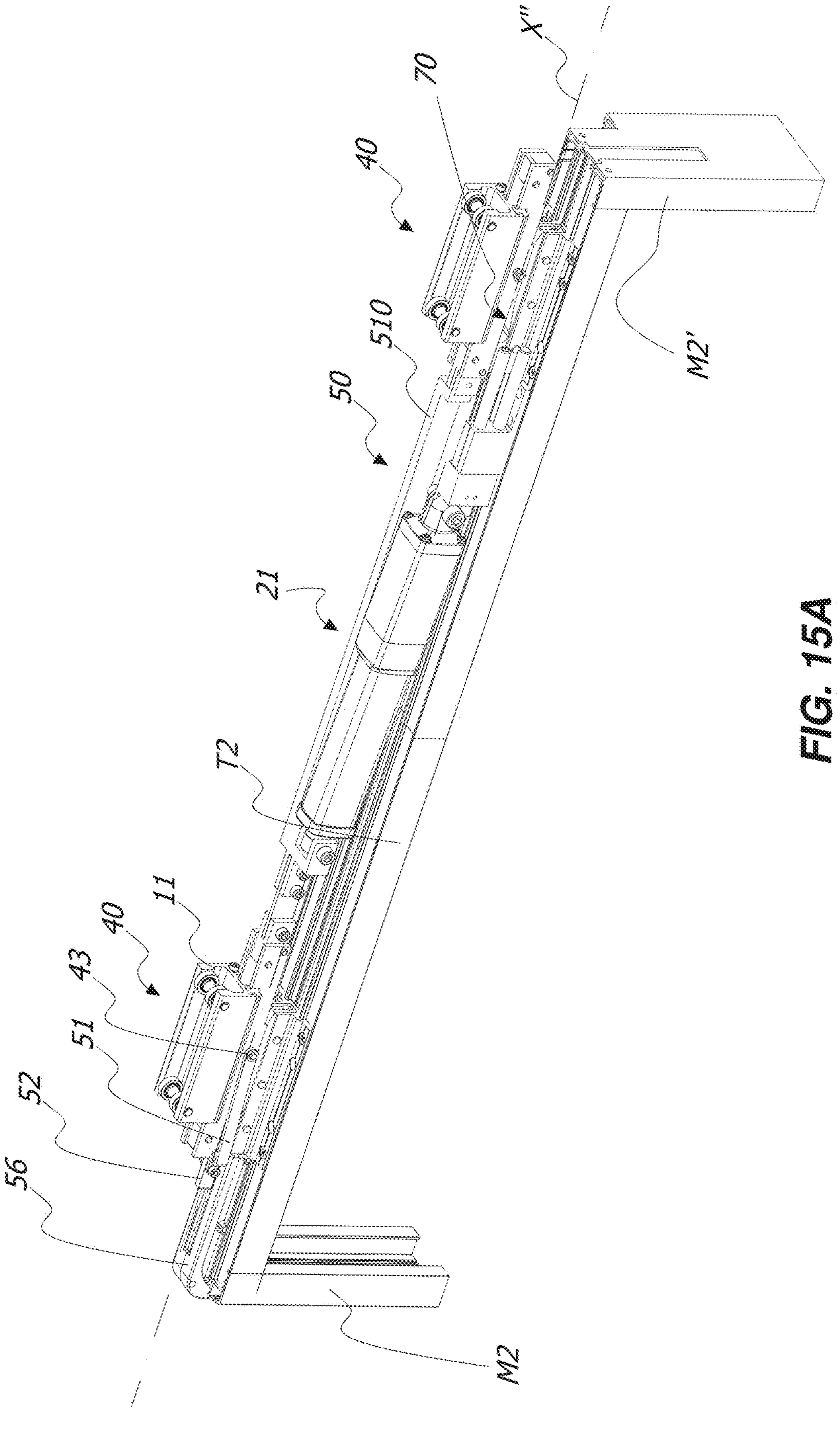
Figure 15B:
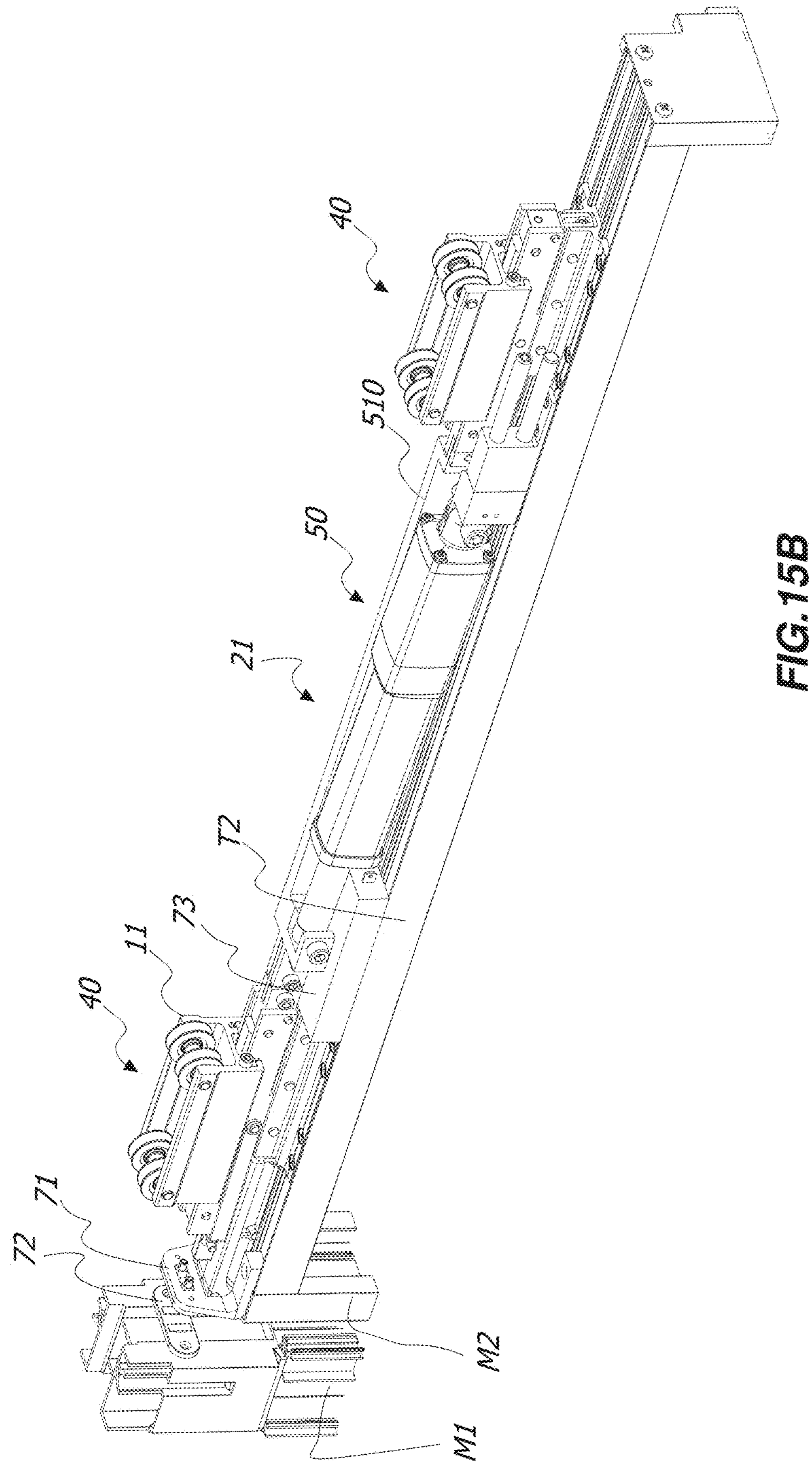
Figure 15C:
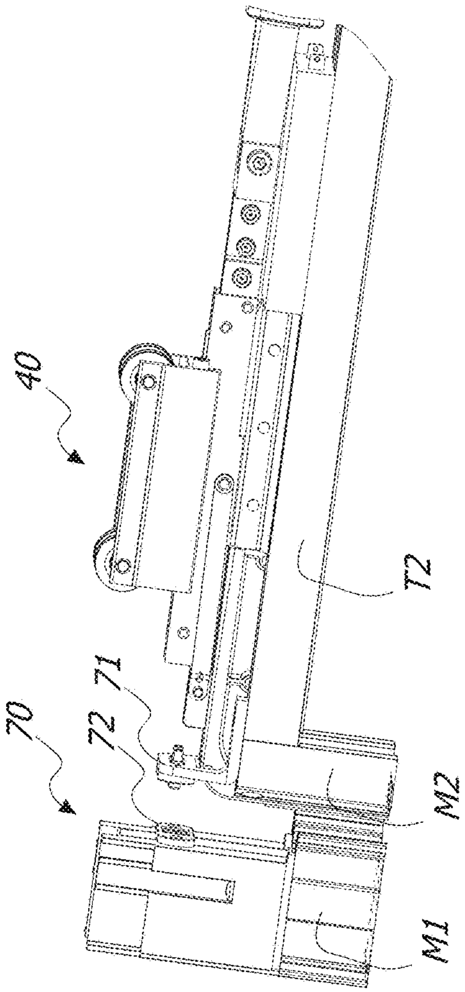
FIGS. 15C and 15D are enlargements of some details.
Figure 15D:
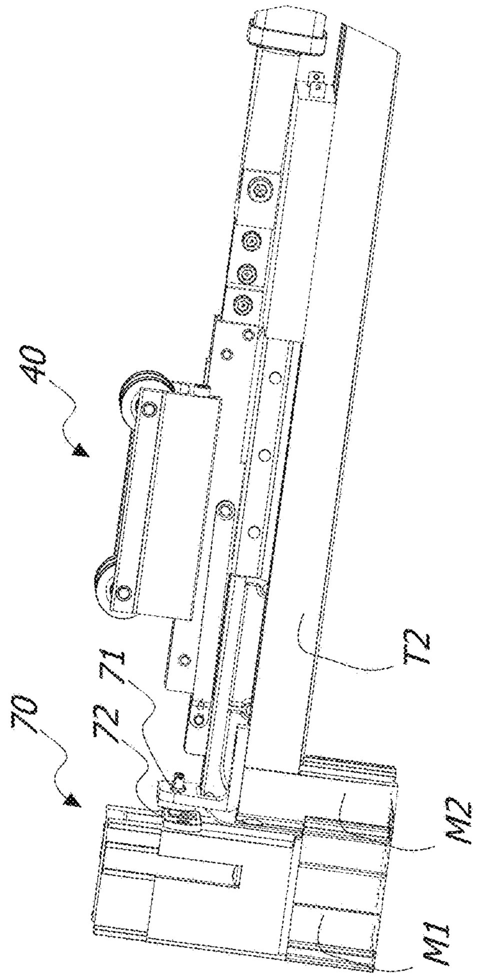
Figure 17B:
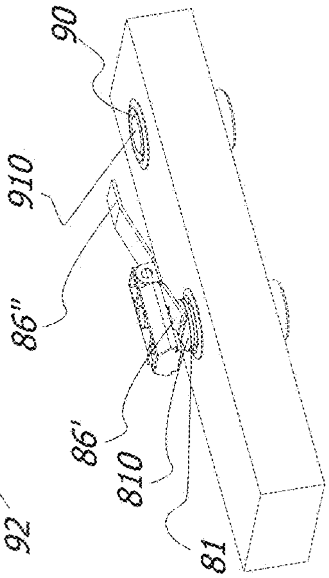
FIGS. 17A, 17B are front and axonometric cross-sectional views of the guide mechanism 80 at the leaf A sliding towards the closure.

As particularly shown in FIG. 15D, the connectors power-supply the actuator means 20 only when they are in contact.

However, it is clear that also the opposite may be provided for without departing from the scope of protection of the attached claims.

According to a preferred but not exclusive embodiment, such connectors may be of the sliding type.

However, it is clear that other types of electrical connectors may be provided for without departing from the scope of protection of the attached claims.

Suitably, the actuator means 20 may be directly connected with the aforementioned first and second portions.

For example, the actuator means 20 may be a linear actuator 21 positioned above the leaf A.

This will allow to conceal the actuator 21 in the frame T, with ensuing high aesthetic appeal.

In addition, not only the actuator means 20, but also the movement means 30 may be exclusively positioned on the crosspiece T2 of the leaf A.

It is clear that such a solution will allow to reduce the overall dimensions of the movement system 1, and it will also allow to reduce the components thereof, hence simplifying assembly, maintenance and reducing wear.

Figure 14:
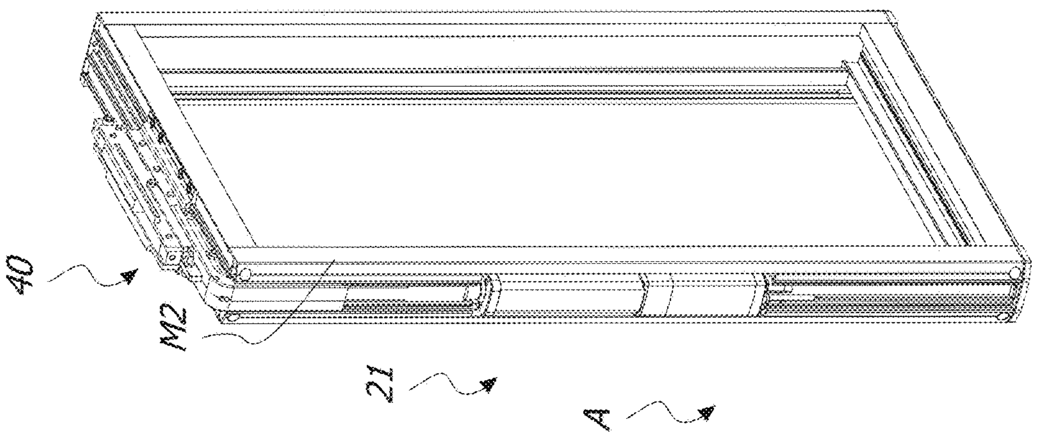
FIG. 14 is an axonometric schematic view of the movement system 1 in electric version with a linear actuator 21 positioned on the upright M2 of the leaf A.

In any case, the actuator 21 may also be positioned at the upright M2 of the leaf A, as particularly shown in FIG. 14, or of the opposite upright M2', without departing from the scope of protection of the attached claims.

Furthermore, the actuator means 20 may be directly connected to the movement means 30, as well as to the lifting and lowering means 40 described above.

As a matter of fact, as particularly shown in FIG. 15A, in the case of the linear actuator 21 slidable along an axis X" parallel to the axis X, it may be connected to the movement means 30 using a stem 510.

Even more specifically, the stem 510 may be connected to the portion 48.

In this manner, the actuation of the linear actuator 21 will cause the relative movement of the first and second portions as well as the movement of the leaf A between the locked and unlocked position.

Also in this case, when the leaf A reaches the unlocked position, the actuator means 20 and the movement means 30 may be electrically disengaged and the leaf A will be free to translate between the unlocked and the open position.

In addition, the linear actuator 21 may ensure that the unlocked position of the leaf A is maintained in safe conditions in a per se known manner.

Figure 1C:
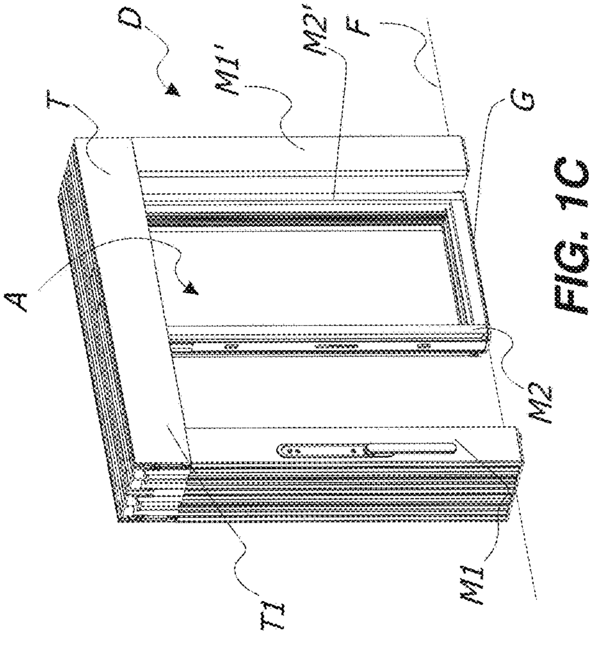
Figure 4:
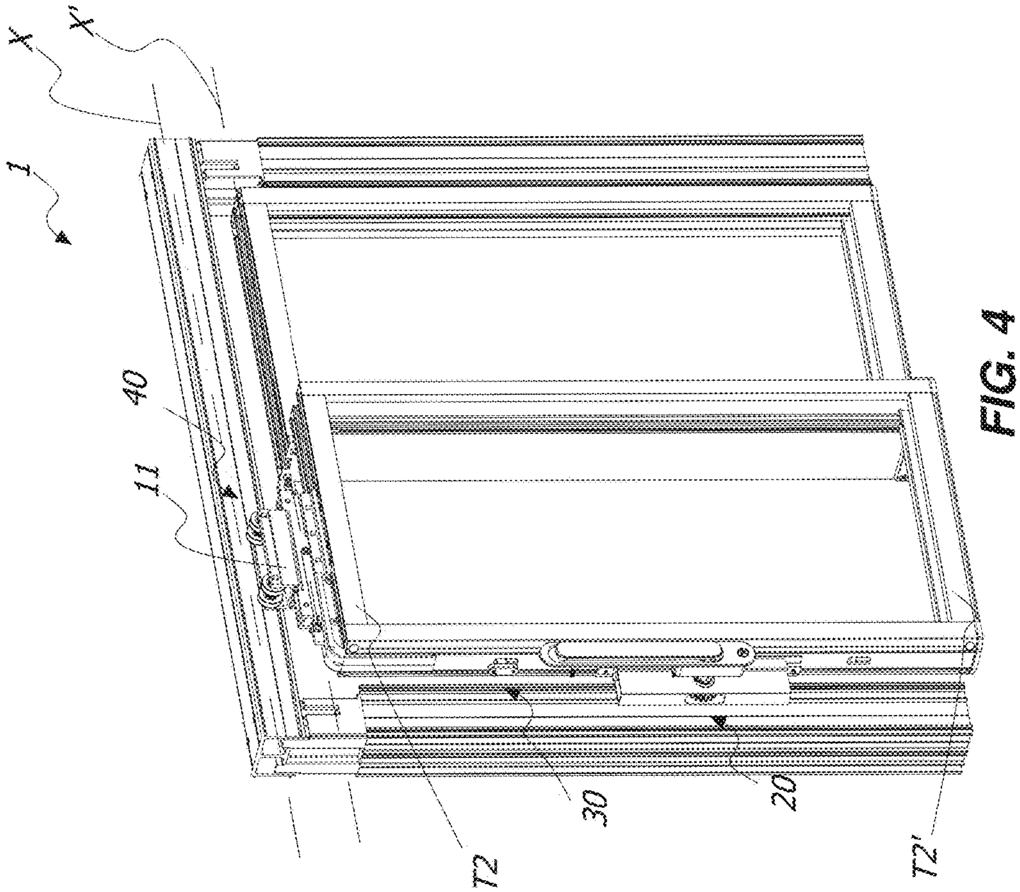
Figure 2:
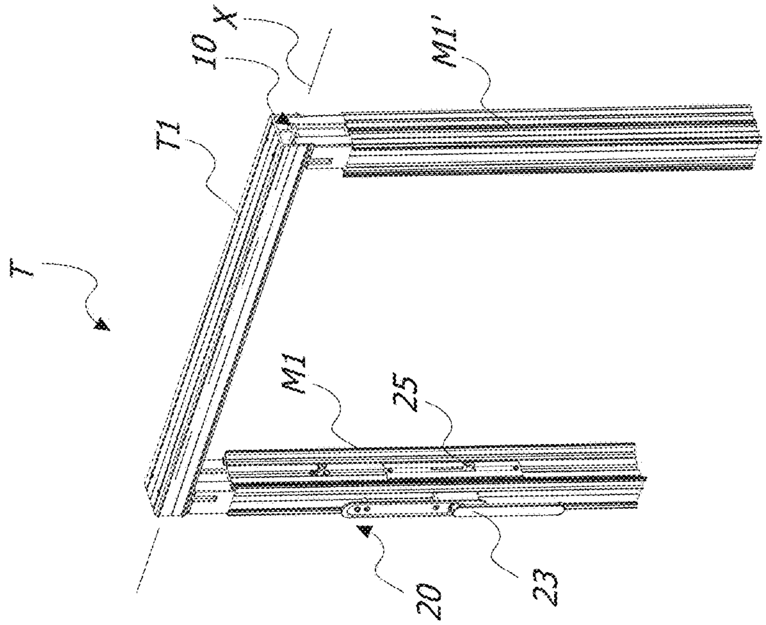
FIG. 2 is an axonometric schematic view of the frame T, of the movement system 1 in manual version.
Figure 21B:
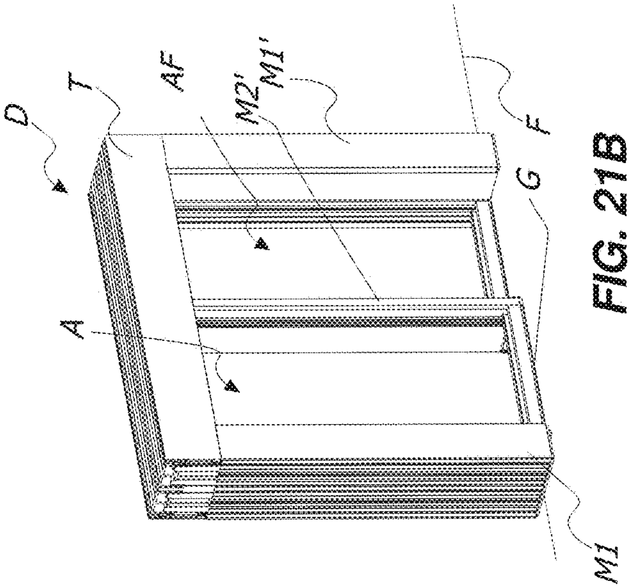
FIGS. 21A, 21B and 21C are axonometric schematic views of a door or door-window D according to the invention, respectively with leaf A locked, unlocked and open, of the system 1 in electric version.
Figure 21A:
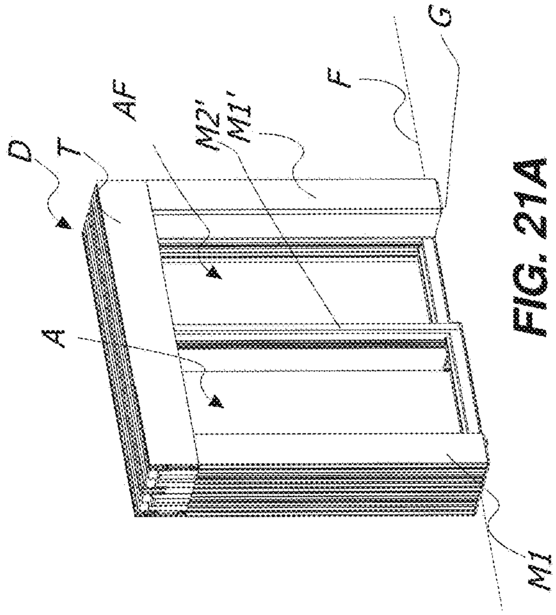
Figure 21C:
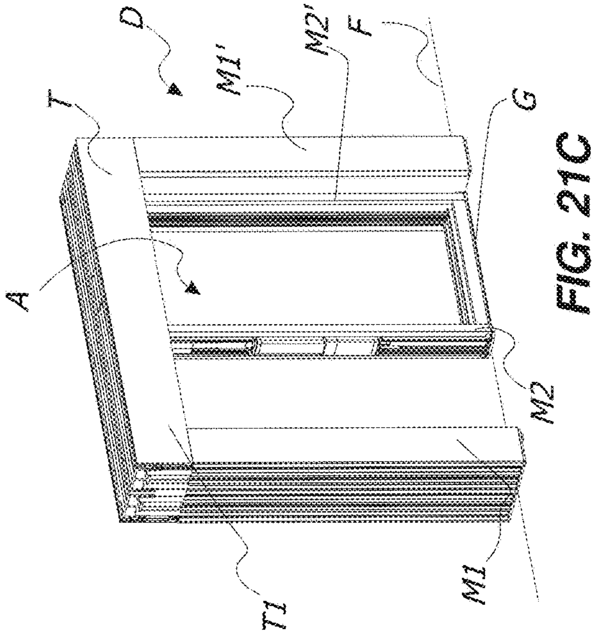

According to a further aspect of the invention, as particularly shown in FIGS. 1A to 1C and in FIGS. 21A to 21C, there may be provided for a door or door-window D which includes the manual or electric movement system 1 as described above.

The present invention may include various parts and/or similar or identical elements. Unless otherwise specified, similar or identical parts and/or elements will be indicated using a single reference number, it being clear that the described technical characteristics are common to all similar or identical parts and/or elements.

The invention is susceptible to numerous modifications and variants, all falling within the scope of protection of the attached claims. All details can be replaced by other technically equivalent elements, and the materials can be different depending on the needs, without departing from the scope of protection defined by the attached claims.

The invention claimed is:

1. A system for manually moving a leaf of a slidable lifting door or door-window, which comprises the leaf and a frame that can be fixed to a stationary support structure over a floor, the leaf including insulating means facing the floor, the system being configured to move the leaf between a locked lowered closed position, in which the insulating means are compressed against the floor so that sliding is hindered, and at least two unlocked raised closed and open positions, between which the leaf is free to slide, the system comprising:

a guide rail configured to be anchored to the frame above the leaf and defining an axis;

sliding means slidably engaged in the guide rail;

movement means for moving the leaf (between the locked lowered closed position and the unlocked raised closed position, the movement means and the sliding means being operatively connected so that the sliding means slidably support the leaf when in the unlocked raised closed position; and actuator means which can be controlled by a user;

wherein the actuator means are configured to be positioned on the frame, the movement means being configured to be positioned on the leaf, the actuator means and the movement means being configured to be mutually selectively engaged so that a user can control a movement of the leaf between the locked lowered closed position and the unlocked raised closed positions exclusively when the leaf is in the locked lowered closed position and the unlocked raised closed positions.

2. The system according to claim 1, wherein, upon the sliding of the leaf between the unlocked raised closed and open positions, the actuator means and the movement means are mutually disengaged.

3. The system according to claim 1, wherein the movement means and the actuator means comprise a male and respectively a female element or vice versa, the male element and the female element being mutually engaged when the leaf is in the locked lowered closed and unlocked raised closed positions and mutually disengaged when the leaf slides between the unlocked raised closed and open positions.

4. The system according to claim 1, wherein the movement means further include lifting/lowering means for lifting and lowering the leaf so as to move the leaf between the locked lowered closed and the unlocked raised closed positions, the lifting/lowering means being configured to be positioned on an upper part of the leaf, the movement means further including motion transmission means operatively connected to the lifting/lowering means to transmit to the lifting/lowering means a motion of the actuator means when the actuator means and the movement means are mutually engaged.

5. The system according to claim 4, wherein the lifting/lowering means have a first portion integrally joined with the leaf and a second portion integrally joined with the sliding means, the first portion and the second portion being operatively connected to the motion transmission means and comprising means for enabling the user to control a mutual movement of first and the second portion between a first and a second operative position respectively corresponding to the locked lowered closed and unlocked raised closed positions of the leaf.

6. The system according to claim 5, wherein the lifting/lowering means comprises an interface element integrally joined with the leaf and including a slot with a first inclined zone defining the first portion, the lifting/lowering means further comprising a slider defining the second portion slidably engaged in the first inclined zone of the slot and pivoted on the sliding means, the slider being operatively connected to the motion transmission means so as to slide parallel to the axis to promote a movement of the first inclined zone of the slot between the first and the second operative positions, so as to promote the movement of the leaf between the locked lowered closed and unlocked raised closed positions.

7. The system according to claim 6, wherein the motion transmission means include a connecting rod having a head attached to the slider and a foot slidably movable in a direction parallel to the axis.

8. The system according to claim 6, further comprising safety means selectively acting on the movement means to lock the leaf upon reaching the unlocked raised closed position, so as to allow a slidable movement of the leaf between the unlocked raised closed and open positions supported by the sliding means.

9. The system according to claim 8, wherein the safety means cooperate with the sliding means to counter a weight of the leaf, so as to keep the leaf in the unlocked raised closed position and prevent a lowering thereof toward the locked lowered closed position.

10. The system according to claim 8, wherein the safety means act on at least one of the first or the second portions of the lifting/lowering mechanism to keep the first and the second portions in the second operative position.

11. The system according to claim 8, wherein the slot further comprises a second zone configured to house the slider when the leaf reaches the second operative position, the second zone of the slot being parallel to the axis or inclined with an inclination opposite to an inclination of the first zone of the slot to define the safety means.

12. A combination of a slidable lifting door or door-window and a system for manually moving a leaf of the slidable lifting door or door-window, the slidable lifting door or door-window comprising the leaf and a frame that can be fixed to a stationary support structure over a floor, the leaf including insulating means facing the floor, the system being configured to move the leaf between a locked lowered closed position, in which the insulating means are compressed against the floor so that sliding is hindered, and at least two unlocked raised closed and open positions, between which the leaf is free to slide, the system comprising:

a guide rail configured to be anchored to the frame above the leaf and defining an axis;

sliding means slidably engaged in the guide rail;

movement means for moving the leaf (between the locked lowered closed position and the unlocked raised closed position, the movement means and the sliding means being operatively connected so that the sliding means slidably support the leaf when in the unlocked raised closed position; and actuator means which can be controlled by a user;

wherein the actuator means are configured to be positioned on the frame, the movement means being configured to be positioned on the leaf, the actuator means and the movement means being configured to be mutually selectively engaged so that a user can control a movement of the leaf between the locked lowered closed position and the unlocked raised closed positions exclusively when the leaf is in the locked lowered closed position and the unlocked raised closed positions.

* * * * *